(12) United States Patent
Weise et al.

(10) Patent No.: US 7,145,077 B2
(45) Date of Patent: Dec. 5, 2006

(54) NON-CONDUCTIVE JUNCTION BOX

(76) Inventors: Gary K. Weise, 1700 Barcelona Cir., Plancentia, CA (US) 92870; Richard J. Kesl, 1700 Barcelona Cir., Plancentia, CA (US) 92870

( * ) Notice: Subject to any disclaimer, the term of this patent is extended or adjusted under 35 U.S.C. 154(b) by 0 days.

(21) Appl. No.: 11/181,570

(22) Filed: Jul. 13, 2005

(65) Prior Publication Data

US 2005/0247474 A1 Nov. 10, 2005

Related U.S. Application Data

(63) Continuation-in-part of application No. 10/004,129, filed on Nov. 1, 2001, now Pat. No. 6,979,783.

(51) Int. Cl.
*H01M 9/02* (2006.01)

(52) U.S. Cl. .......................... 174/58; 174/63; 174/135; 220/4.02

(58) Field of Classification Search .................. 174/50, 174/58, 60, 17 R, 135, 66 R, 63, 480, 650; 220/4.02, 3.2; 248/906; 439/535
See application file for complete search history.

(56) References Cited

U.S. PATENT DOCUMENTS 4,103,101 A * 7/1978 Maier ........................ 174/65 R

* cited by examiner

*Primary Examiner*—Dhiru R. Patel
(74) *Attorney, Agent, or Firm*—Terry L. Miller

(57) ABSTRACT

An improved, non-conductive electrical junction box includes a wall defining an insert recess. An insert member is received into the insert recess and defines a conduit socket in order to provide for an end portion of an electrical conduit to be joined with the junction box, providing for electrical wiring to pass between the conduit and the junction box.

11 Claims, 2 Drawing Sheets

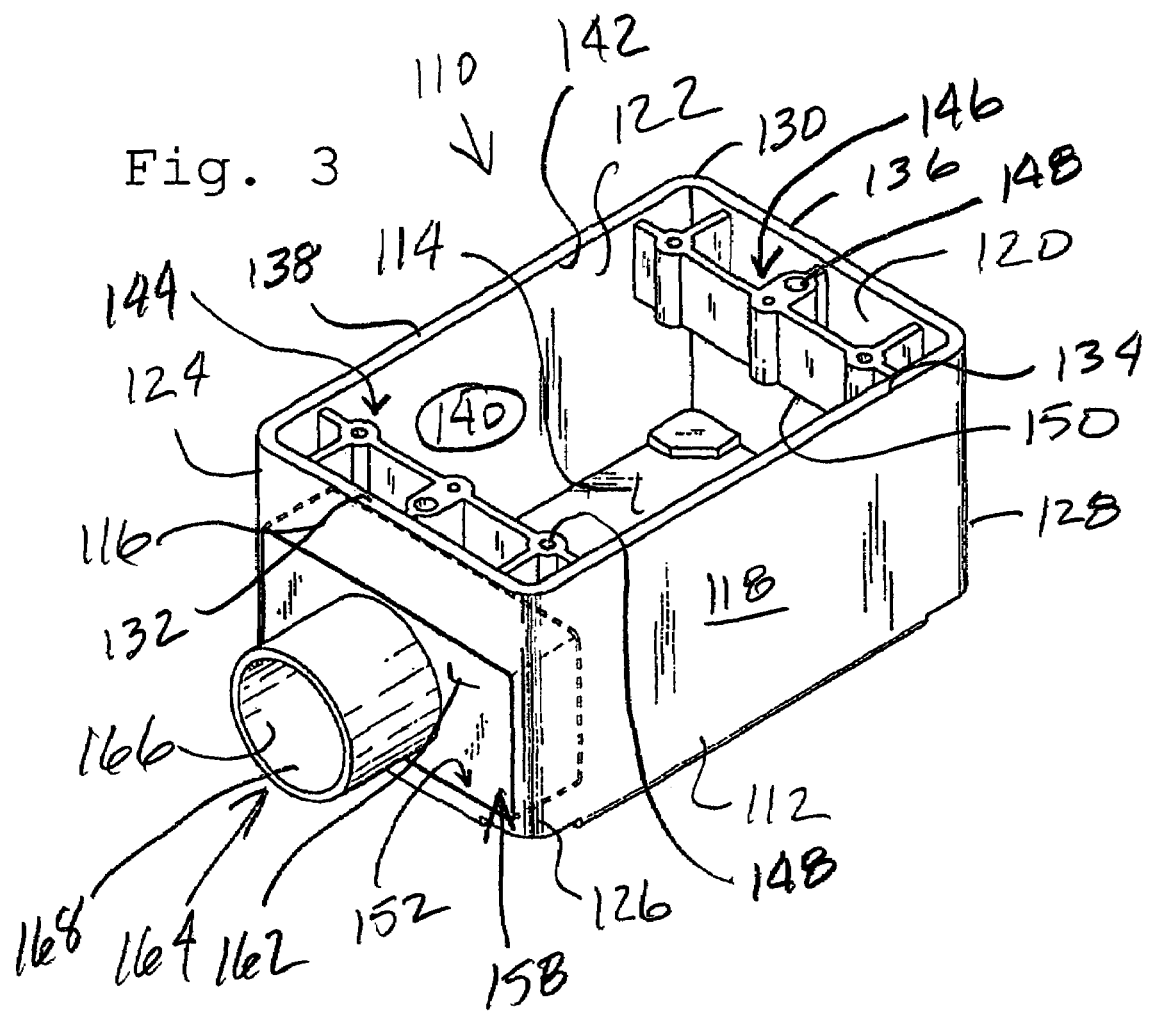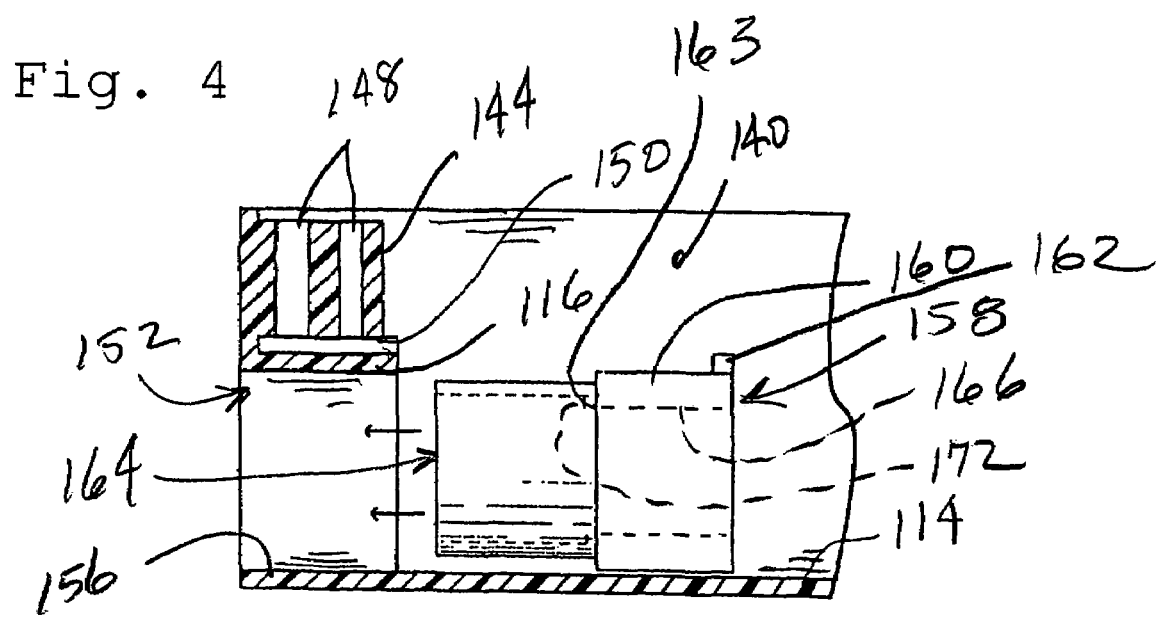

NON-CONDUCTIVE JUNCTION BOX

CROSS REFERENCE TO RELATED APPLICATION

Figure 1:
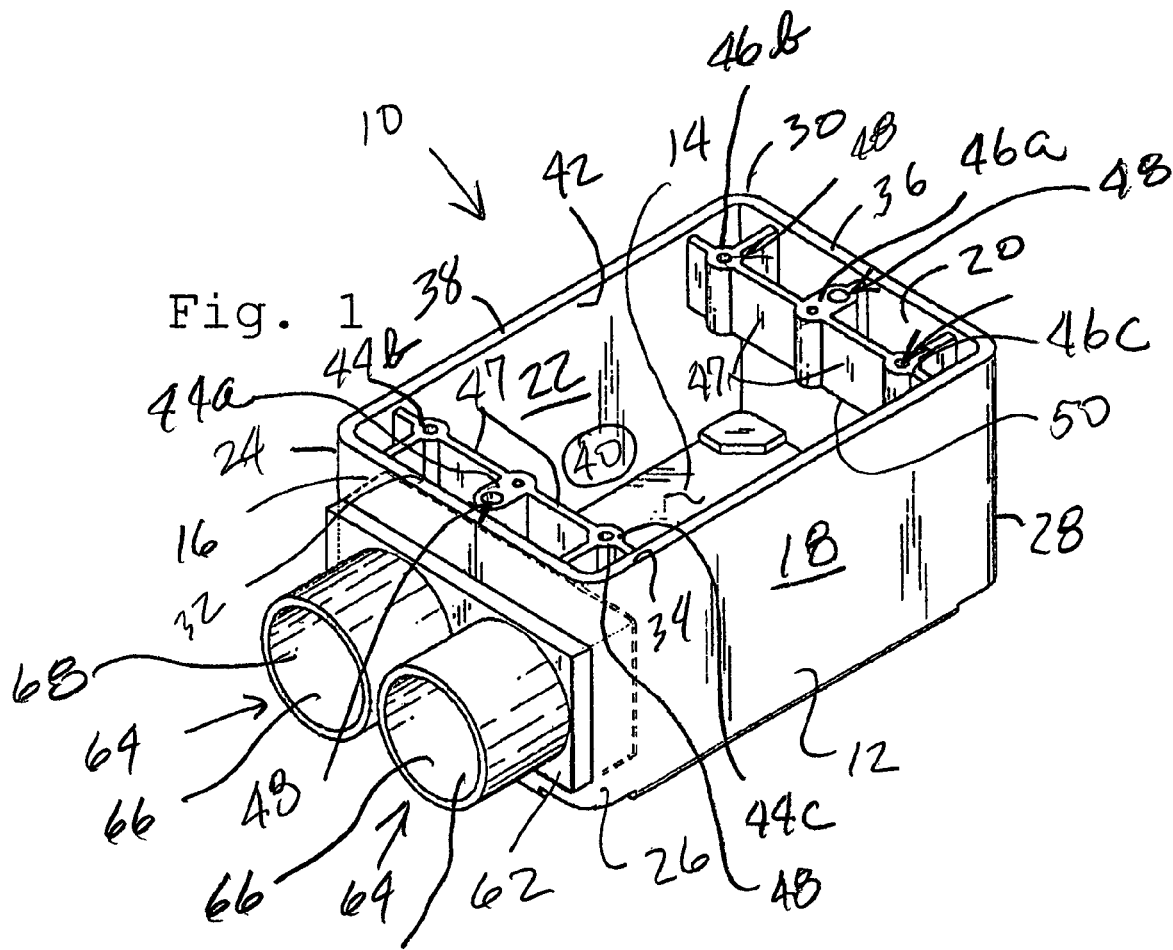

This application is a Continuation-in-Part of U.S. patent application Ser. No. 10/004,129 filed 1 Nov. 2001, now U.S. Pat. No. 6,979,783, issued, Dec. 27, 2005, and the disclosure of which is incorporated herein by reference to the extent necessary for a complete and enabling disclosure of the present invention.

BACKGROUND OF THE INVENTION

1. Field of the invention

This invention is in the field of protective enclosures for electrical wiring. More particularly, this invention relates to a non-conductive protective enclosure for electrical wiring and related electrical components, which enclosure is of a size and configuration generally recognized in the trade as a junction box. Junction boxes are generally manufactured and supplied to the trade in industry-standard sizes and configurations. Some conventional junction boxes are made entirely or partially of conductive metallic material, but increasingly the electrical trade, and especially some particular applications such as electrical wiring in wet environments, call for junction boxes that are formed entirely of non-conductive materials. Generally, electrical wiring terminations and electrical components are installed within such junction boxes in both residential and industrial environments. Typically, such electrical components and wiring terminations must be installed into and attached to a junction box so as to provide proper spacing between components, to provide environmental protection to the wiring terminations and components, and to prevent inadvertent contact with the wiring and components, for example, by people or animals. An important consideration is that a junction box be as spacious inside as is practicable for a particular size class in order to provide adequate room for the wiring terminations, and also be very flexible in the methods allowed for routing wires and conduits to and from the junction box.

2. Related Technology

Over the years there have been many types of electrical junction boxes developed, some for specialized usage and others for more generalized purposes, often with a view to both low cost of manufacture and to economy of use. The main purposes of such junction boxes have been to provide environmental protection for wiring terminations and electrical components installed in the boxes, while also preventing inadvertent contact by humans and animals with the installed wiring and electrical components.

Junction boxes have been designed in many and varying shapes and sizes, but have these above-described conventional considerations and functions in common. Many junction boxes are made to industry standard or to trade standard sizes. Earlier, junction boxes were generally constructed of metal and had only pre-formed knockouts for the attachment of conduits. When the electrician or installer found it necessary to have a hole for wire or conduit access to a junction box, this installer used a tool, such as either a punch or screwdriver, to remove a pre-formed knockout.

More recently, junction boxes have been constructed of plastics, or a mix of metals and plastics, and provide a wide variety of configurations for standard and for specialized uses. Conventional junction boxes which may be relevant to this invention include those set out in the following United States patents:

U.S. Pat. No. 5,169,013, issued 8 Dec. 1992, to Albert Lammens, Jr.;

U.S. Pat. No. 5,216,203, issued 1 Jun. 1993, to Edward E. Gower;

U.S. Pat. No. 5,352,850, issued 4 Oct. 1994, to Trevor W. Norris;

U.S. Pat. No. 5,541,363, issued 30 Jul. 1996, to Gary K. Weise, et al. (a named coinventor on the present application);

U.S. Pat. No. 5,828,001, issued 27 Oct. 1998, to Jan J. Schilhiam;

U.S. Pat. No. 5,936,200, issued 10 Aug. 1999, to Mike K. Park; and

U.S. Pat. No. 5,942,726, issued 24 Aug. 1999, to Kenneth Reiker.

A significant disadvantage of conventional junction boxes results from their comparative inflexibility of configuration and installation; and particularly results from a conventional rigidity with respect to routing and attachment of electrical conduits to the conventional junction.

SUMMARY OF THE INVENTION

In view of the deficiencies of the conventional related technology, it is an object of this invention to overcome one or more of these deficiencies.

This invention provides a molded non-conductive plastic junction box that has an interior volume which is larger than that of conventional junction boxes of the same exterior size. The present inventive junction box has a back wall and four contiguous side walls formed of non-conductive material; and each joined both to the back wall and to it's two contiguous side walls. The side walls are arranged in spaced apart opposite pairs and each side wall terminates at an end edge in a common plane with the other side walls to cooperatively define an opening into the box. This opening is used to insert components and wiring into the box and may be overlaid or closed with a cover plate to provide a dry, non-corrosive, non-conductive, and economical enclosure.

The junction box includes mounting lugs adjacent to this opening for securing a cover plate to the box as well as for securing at least one electrical component inside the box. These mounting lugs extend substantially from the plane of the junction box opening toward but short of the back wall of the box in order to provide increased interior volume for the junction box inwardly of the mounting lugs.

Still further to the above, alternative embodiments of the present inventive junction box include a unique insert member, which is receivable into an insert recess of the junction box, and which insert member defines one or more conduit sockets at which conduits may be coupled to the junction box.

Other objects, features, and advantages of the present invention will be apparent to those skilled in the art from a consideration of the following detailed description of two exemplary preferred embodiments of the inventive junction box, when taken in conjunction with the appended drawing Figures. In these appended drawing Figures, features which are the same or which are analogous in structure or function are indicated by the same reference numeral throughout the several views.

BRIEF DESCRIPTION OF THE DRAWING FIGURES

Figure 2:
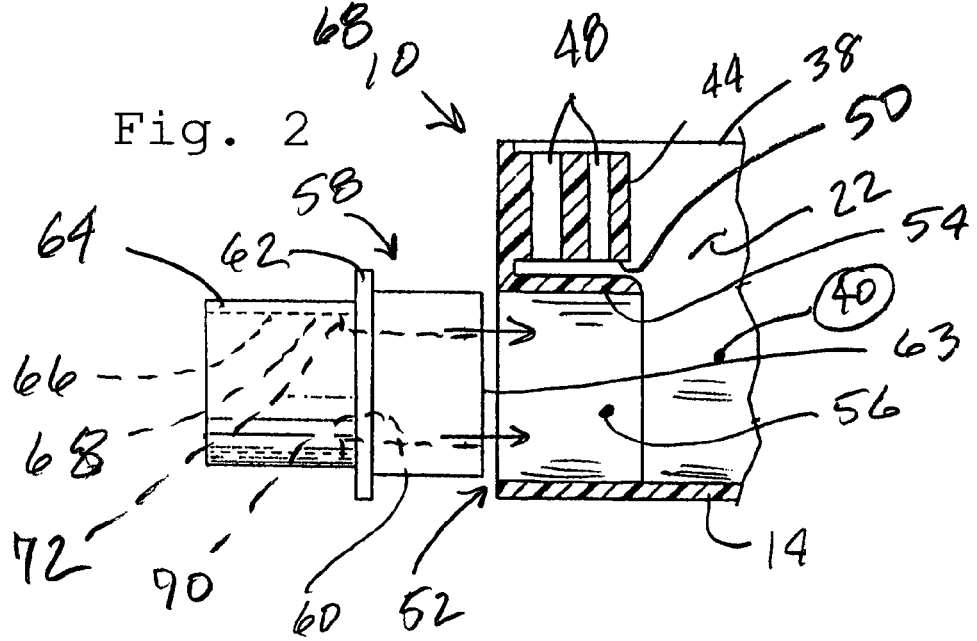

FIG. 1 is a perspective view of a junction box embodying the present invention with a pair of adjacent conduit sockets installed;

FIG. 2 provides a fragmentary side elevation view, partially in cross section, of the junction box seen in FIG. 1;

FIG. 3 is a perspective view of an alternative junction box embodying the present invention with a singular conduit sockets installed;

FIG. 4 provides a fragmentary side elevation view, partly in cross section, of the junction box seen in FIG. 3;

DETAILED DESCRIPTION OF EXEMPLARY PREFERRED EMBODIMENTS OF THE INVENTION

Referring in general to drawings appended to this application, and considering first FIGS. 1 and 2, it can be seen that this invention provides a high-volume, high-utility, non-conductive enclosure (i.e., a junction box) for the placement of electrical components and wiring. In FIG. 1 a junction box 10 embodying the present invention is seen in perspective. This junction box 10 includes a chambered prismatic body 12 formed of non-conductive plastic material. More particularly, the body 12 may preferably be injection molded of polyvinyl chloride (PVC), or of other thermoplastic or thermoset polymer materials known in the art.

The body 12 includes a back wall 14, and plural (i.e., at least four) contiguous walls 16, 18, 20, and 22 which are generally perpendicular to the back wall 14. The contiguous walls 16–22 are joined integrally to the back wall 14, and are each also integrally joined to each of the two adjacent ones of the plural walls 16–22. These walls 16–22 are arranged in opposing pairs of generally parallel walls, and the adjacent walls are integrally joined to one another to form corner junctions 24, 26, 28, and 30, although the invention is not so limited. In other words, a junction box according to the present invention need not be rectangular or square in plan view, and could, for example, be hexagonal or octagonal in plan view.

Further to the above, the walls 16–22 are arranged in opposing generally parallel pairs so that they form a pair of side walls 18, 22; and a pair of end walls 16, 20. Each of the walls 16–22 has a respective termination edge or end edge 32–38, which end edges are all substantially in a common plane. The walls 14–22 of the junction box 10 cooperatively bound a cavity 40, and also cooperatively define an opening 42 to this cavity 40 within junction box 10. The end edges 32–38 circumscribe this opening 42. In other words, the opening 40 provides access to the cavity 42 formed within the junction box 10 by the cooperation of the back wall 14 and the side walls 16–22.

Turning now to consideration of FIGS. 1 and 2 in greater detail, it is seen that the junction box 10 also includes a plurality of inwardly extending mounting lugs 44, 46. The use of these mounting lugs will be familiar to those ordinarily skilled in the pertinent arts. However, it is seen that these mounting lugs 44, 46 include a pair of center mounting lugs 44a, 46a (i.e., one center mounting lug centered on each end wall 16, 20); and four side mounting lugs 44b, 44c, 46b, and 46c (i.e., two side mounting lugs disposed on each end wall 16, 26 adjacent to its intersection with the side walls 18, 22). Each of the mounting lugs 44, 46 is individually cantilevered from a respective one of the end walls 16, 20, and is provided with at least one respective hole (all generally referenced with the numeral arrowed 48), which may be a screw hole. Those ordinarily skilled in the art will recognize that the screw holes 48 are usable for securing an electrical component (such as a switch or receptacle) within the cavity 40, or for securing a cover plate (not seen in the drawing Figures) at (i.e., across and closing) the opening 42. Similarly, the center mounting lugs 44a, 46a are each provided with a guide hole, (also indicated with the arrowed numeral 48), which is somewhat larger than the screw holes, and which by allowing for the receipt of a guide pin on a standard ground fault interrupter (GFI) provides for such a GFI to be installed within the junction box 10.

As is seen in FIGS. 1 and 2, the mounting lugs 44, 46 each extend from substantially the level of the opening 42 (i.e., substantially coplanar with the end edges 32–38) inwardly of the box (i.e., inwardly of cavity 40) toward the back wall 14. These groups of mounting lugs 44 and 46 are integrally united at each end of the junction box 10 by a respective uniting strap or joining web, each referenced with the numeral 47. Moreover, it is to be noted that all of the mounting lugs 44, 46 stop short of the back wall 14. That is, each of the mounting lugs 44, 46 defines a respective termination surface 50, which is disposed toward (i.e., confronting) but spaced from the interior surface of back wall 14. Stated differently, the termination surfaces 50 of mounting lugs 44, 46 are all spaced away from back wall 14 by about the same dimension, both in order to provide an increased interior volume for the box 10 (i.e., for each particular exterior size of junction box which may be made using this present invention), and in order to provide the end walls 16, 20 with a portion that is free of obstruction by the mounting lugs 44, 46.

As is best seen in FIG. 2, it is in the portions of the end walls 16, 20 between the mounting lugs 44, 46, and the inside surface of wall 14 that conduit sockets may be installed, as will be further explained. It will be appreciated that the embodiment of FIGS. 1 and 2 illustrates a pair of conduit sockets installed only in the end wall 16 which is closer to the viewer of this Figure. However, the invention is not so limited, and the other end wall 20, as well as the side walls 18, 22 may be provided with an insert recess and with an insert defining one or more conduit sockets, as will be further described. This allows a user of the junction box 10 to accomplish a unique level of flexibility of installation and utilization for the inventive junction box 10.

Attention now to FIGS. 1 and 2 will reveal a junction box 10 providing for attachment of one or more electrical conduits to the junction box. In order to provide for attachment of electrical conduits and routing of electrical wire to and from the cavity 40, the wall 16 closest to the viewer of FIG. 1 defines a generally rectangular insert recess, generally referenced with the arrowed numeral 52, best seen in FIG. 2. This insert recess 52 is defined only in wall 16 according to the embodiment illustrated in FIGS. 1 and 2, although the invention is not so limited. In other words, in addition to or instead of the wall 16 defining an insert recess 52, any one or all of the other walls 16, 18, 20, or 22 may define a similar insert recess. As is best seen in FIG. 2, the insert recess 52 includes a wall portion 54 extending inwardly of the cavity 40, and in cooperation with the back wall 14, bounding a rectangular passage or recess 56. That is, in axial elevation view, the recess 56 is rectangular.

As FIG. 1 shows, received into this recess 56 is an insert member 58. FIG. 2 shows the insert member in a preparatory position about to be inserted into the recess 56, as is indicated by the arrows on FIG. 2. The insert member 58 includes a rectangular body portion 60, which is sized and shaped to be matchingly received into the insert recess 56. That is, as is seen best in FIG. 2, the rectangular body portion 60 of insert member 58 defines an end surface 62 which when the insert member 58 is secured into the recess 56 will be substantially flush or coextensive with the inner end of wall portion 54. Preferably, the insert member 58 is adhesively secured into the recess 56 by placing adhesive on the surface of rectangular body portion 60 as it is illustrated in FIG. 2, and then sliding the body portion 60 into recess 56. As is seen in FIGS. 1 and 2, the body portion 60 leads to or terminates in a flange 62 disposed about this body portion, and engageable with the outer surface of junction box 10, as is seen in FIG. 1.

Outwardly of the flange 62 the insert member 58 defines a pair of outwardly extending bosses 64, each of which defines a respective stepped through bore 66. Each through bore 66 is sized and configured in its outward or outer portion 68 to provide a respective one of a pair of conduit sockets (also referenced with the numeral 68). An inner portion 70 (seen only in FIG. 2, and as hidden lines) of the bore 66 is slightly smaller than the conduit socket portion 68 in order to provide a shoulder 72 against which an electrical conduit (not seen in the drawing Figures) may seat. The bore portion 70 also provides for electrical wiring to pass between the electrical conduit and the cavity 40. A respective plastic electrical conduit may be adhesively secured into each conduit socket 68.

An important feature of the junction box 10 and insert member 58 is that the conduit sockets 68 may be of differing sizes. In other words, an insert member with two ½ inch sockets may be provided, and another insert member with two ¾ inch sockets, and perhaps another insert member with two one inch sockets may be provided. Still another insert member may have two sockets of different sizes, perhaps one of ½ inch size, and the other of ¾ inch size. Still further, any one of these alternative insert members may be inserted adhesively into the recess 56 so that the junction box 10 may be used with a wide variety of differing sizes of electrical conduits. Still alternatively, as will be seen in FIGS. 3 and 4, an insert member having only a single conduit socket may be provided.

In view of the above, it is apparent that a single junction box structure 10 may be utilized with a variety of different insert members 58 in order to connect with a wide range of different sizes of conduits. That is, an electrician who is installing the junction box 10 need only carry a single configuration and size of box, and can then also carry a variety of relatively small and inexpensive insert members 58 in order to provide for an installation with a variety of different sized conduits. This flexibility of installation for the junction box 10 greatly increases its utility over conventional junction boxes.

Turning now to FIGS. 3 and 4, an alternative embodiment of junction box is illustrated. Because this embodiment has many features in common with the embodiment of FIGS. 1 and 2, features which are the same as or analogous to those of FIGS. 1 and 2 are indicated on FIGS. 3 and 4 with the same numeral used above, and increased by one-hundred (100). Turning now to FIGS. 3 and 4, a junction box 110 includes a chambered prismatic body 112 preferably injection molded of polyvinyl chloride (PVC), or of other thermoplastic or thermoset polymer materials known in the art. The body 112 includes a back wall 114, and plural contiguous walls 116, 118, 120, and 122. The walls 116–122 form corner junctions 124, 126, 128, and 130. The walls 114–122 have a respective coextensive end edge 132–138, and cooperatively bound a cavity 140, and an opening 142. The junction box 110 also includes a plurality of inwardly extending mounting lugs 144, 146, with holes 148. Each of the mounting lugs 144, 146 defines a respective termination surface 150, which is disposed toward (i.e., confronting) but is also spaced from the interior surface of back wall 114.

Further to the above, the junction box 110 provides for attachment of an electrical conduit to the junction box by defining a generally rectangular insert recess, generally referenced with the arrowed numeral 152, best seen in FIG. 4. This insert recess 152 is defined only in wall 116 according to the embodiment illustrated in FIGS. 1 and 2, although the invention is not so limited. As is best seen in FIG. 4, the insert recess 152 includes a wall portion 154 extending inwardly of the cavity 140, and in cooperation with the back wall 114, bounding a rectangular passage or recess 156.

In view of the above, it may be appreciated that the body 112 is or can be a substantial duplicate of the body 12 illustrated in FIGS. 1 and 2. However, as FIG. 3 shows, received into this recess 156 is an insert member 158. FIG. 4 shows the insert member 158 in a preparatory position within the cavity 140, and about to be inserted outwardly through the recess 156, as is indicated by the arrows on FIG. 4. The insert member 158 includes a rectangular body portion 160, which is sized and shaped to be matchingly received into the insert recess 156. As is best seen in FIG. 4, the rectangular body portion 160 of insert member 158 defines an end surface 163 which when the insert member 158 is secured into the recess 156 will be substantially flush or coextensive with the outside surface of end wall 116. Preferably, the insert member 158 is adhesively secured into the recess 156 by placing adhesive on the surface of rectangular body portion 160 as it is illustrated in FIG. 4, and then sliding the body portion 160 from within cavity 140 outwardly into recess 156. As is seen in FIG. 4, the body portion 160 includes an upwardly extending ear or partial flange 162 disposed within the cavity 140, and engageable with the wall portion 154 to position the insert member 158 in the recess 156, as can be appreciated by a consideration of FIGS. 3 and 4.

Outwardly of the body portion 160 the insert member 158 defines a singular outwardly extending boss 164, which defines a stepped through bore 166. This through bore 166 is sized and configured in its outward or outer portion 168 to provide a conduit socket (also referenced with the numeral 68). An inner portion 170 of the bore 166 is slightly smaller than the conduit socket portion 168 in order to provide a shoulder 172 against which an electrical conduit (not seen in the drawing Figures) may seat. The bore portion 170 also provides for electrical wiring to pass between the electrical conduit and the cavity 140. A respective plastic electrical conduit may be adhesively secured into the conduit socket 168.

So, in view of the above, it is to be appreciated that an important feature of the junction boxes 10 and 110 is that insert members 58, 158 may be configured to be inserted from outside of a recess 56, 156 on a junction box body, or may be configured to be inserted from inside of the cavity 40 or 140 outwardly through the recess. Further, the insert members may define only one, or may define plural conduit sockets, and these conduit sockets may be all of the same size, or may be of differing, varying, or mixed sizes. In the present embodiments, the alternative insert members may be inserted adhesively into the recess 56 or 156 so that the junction box 10 or 110 may be used with a wide variety of differing sizes of electrical conduits. Still alternatively, provision may be made for the insert members to mechanically interlock with the body 12 or 112, so as to retain the insert members 56 or 156. So to, it is to be appreciated that the shape in axial elevation view, of the insert recess and matching insert member need not be rectangular, but that these shapes can be a variety of square, oval, or even circular rounded shapes.

In view of the above, it is apparent that a single junction box structure 10, or 110 may be utilized with a variety of different insert members 58 or 158 in order to provide for connection to the junction box of a wide range of different sizes and numbers of electrical conduits.

Those skilled in the art will further appreciate that the present invention may be embodied in other specific forms without departing from the spirit or central attributes thereof. Because the foregoing description of the present invention discloses only particularly preferred exemplary embodiments of the invention, it is to be understood that other variations are recognized as being within the scope of the present invention. Accordingly, the present invention is not limited to the particular embodiment which has been described in detail herein. Rather, reference should be made to the appended claims to define the scope and content of the present invention.

We claim:

1. An electrical junction box having a non-conductive body with plural walls cooperatively arranged to bound a volume, and an opening by which electrical components and wiring may pass into and from said volume; at least one of said plural walls defining an elongate cylindrical insert recess opening outwardly from said volume, and non-conductive insert member including an elongate cylindrical portion matchingly configured to be non-rotationally received and retained in said insert recess, and said insert member also providing at least one outwardly disposed conduit socket for attaching an end portion of an electrical conduit to said junction box; said insert member defining a protruding flange structure for positioning said portion axially within said insert recess.

2. The junction box of claim 1 wherein said protruding flange structure for positioning said insert member axially within said insert recess includes said insert recess having an outwardly disposed flange portion confronting and engageable against an outer wall surface of said junction box, whereby said portion of said insert member is received axially into and retained in said insert recess with said flange portion adjacent said outer wall surface of said junction box.

3. The junction box of claim 1 wherein said protruding flange structure for positioning said insert member axially within said insert recess includes said insert member having an ear portion disposed on said portion inwardly of said volume and engageable against an inwardly disposed surface of said junction box, whereby said insert member is positioned within said volume and is inserted axially through said insert recess so that said portion is received into and retained in said insert recess with said ear portion within said volume.

4. The junction box of claim 1 wherein said insert member includes a through passage, an outer portion of which provides said conduit socket, and an inner portion of which provides for electrical wiring to pass between said electrical conduit and said volume.

5. A method of providing non-conductive electrical junction box, said method comprising steps of:
providing plural non-conductive walls for said junction box, and cooperatively arranging and interconnecting said plural walls so as to substantially bound a volume;
utilizing an end edge of said plural walls to cooperatively define an opening to said volume by which electrical components and electrical wiring may pass into and from said volume;
utilizing at least one wall of said plural walls of said junction box to define an elongate cylindrical insert recess, and configuring said insert recess to open outwardly from said volume to ambient at substantially a constant size in axial end view of said insert recess, whereby said insert recess may axially slidably and non-rotationally receive a matchingly configured elongate cylindrical portion of an insert member which provides for joining to said junction box of at least one electrical conduit.

6. The method of claim 5 further including the steps of providing for said insert member to include structure for positioning said portion within said insert recess.

7. The method of claim 6 further including the step of providing for said positioning structure of said insert member to include an element selected from the group consisting of: an outwardly disposed flange engageable with an outer surface of said junction box, or an inwardly disposed ear engageable with an inner surface of said junction box within said volume.

8. The method of claim 5 including the step of selecting a selected shape for said insert recess in axial view, said selected shape being selected from the group consisting of: rectangular, square, and oval.

9. An insert member for use in combination with non-conductive electrical junction box defining an insert recess for slidably receiving said insert member, said insert member including an elongate body of selected cylindrical configuration in end view to be slidably received non-rotationally into said insert recess, and at least one boss portion extending on said body portion, said body and boss portion cooperatively defining a stepped through bore opening outwardly on said boss portion and extending axially through said body, said stepped through bore providing a socket for receiving an end portion of an electrical conduit, and said body including a positioning structure selected from the group consisting of a protruding flange positioned to be disposed outwardly of said insert recess, and a protruding ear positioned to be disposed inwardly of said insert recess and within said junction box.

10. In combination, a non-conductive electrical junction box configured to receive an insert member, and a insert member configured to be received by said junction box and providing for attachment to said junction box of at least one electrical conduit in order to pass electrical wiring between the conduit and said junction box;
said junction box having a non-conductive body with plural walls cooperatively arranged to bound a volume, and an opening by which electrical components and wiring may pass into and from said volume; at least one of said plural walls defining an elongate cylindrical insert recess opening outwardly from said volume, and
said insert member including an elongate cylindrical portion matchingly configured to be slidably and non-rotationally received axially into and to be retained in said insert recess and also providing at least one outwardly disposed conduit socket for attaching an end portion of an electrical conduit to said junction box; said insert member defining structure for axially positioning said portion within said insert recess.

11. A non-conductive electrical junction box having a body with plural non-conductive walls cooperatively arranged to bound a volume and an opening by which electrical components and wiring may pass into and from said volume; at least one of said plural walls defining an elongate cylindrical insert recess opening outwardly from said volume at a substantially constant size in axial end view of said insert recess, whereby said insert recess may receive an insert member including an elongate cylindrical portion matchingly configured to be slidably and non-rotationally received and retained into said insert recess and providing an outwardly disposed conduit socket for attaching an electrical conduit to said junction box.

* * * * *